(12) United States Patent
Moriwaki

(10) Patent No.: US 7,742,114 B2
(45) Date of Patent: Jun. 22, 2010

(54) ELECTRO-OPTIC DEVICE, METHOD FOR FABRICATING THE SAME, AND ELECTRONIC APPARATUS

(75) Inventor: Minoru Moriwaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 11/612,966

(22) Filed: Dec. 19, 2006

(65) Prior Publication Data
US 2007/0159563 A1  Jul. 12, 2007

(30) Foreign Application Priority Data
Jan. 6, 2006   (JP)   ............................. 2006-001449

(51) Int. Cl.
*G02F 1/1343* (2006.01)
(52) U.S. Cl. ...................................... 349/39
(58) Field of Classification Search .................... 349/39
See application file for complete search history.

(56) References Cited

U.S. PATENT DOCUMENTS 6,583,830 B2 * 6/2003 Yasukawa et al. .............. 349/43

| | | | |
|---|---|---|---|
| 2002/0014627 A1 | 2/2002 | Sato | |
| 2003/0222261 A1 | 12/2003 | Murade | |
| 2005/0127810 A1 | 6/2005 | Fukuhara et al. | |

FOREIGN PATENT DOCUMENTS

| JP | A 2002-156652 | 5/2002 |
|---|---|---|
| JP | A-2005-338746 | 12/2005 |

* cited by examiner

*Primary Examiner*—James A Dudek
(74) *Attorney, Agent, or Firm*—Oliff & Berridge PLC

(57) ABSTRACT

An electro-optic device includes a substrate, data lines and scanning lines extending so as to cross each other, pixel electrodes each arranged for one of a plurality of pixels defined by crossing of the data lines and the scanning lines in plan view of the substrate, thin film transistors each electrically connected to one of the pixel electrodes, and storage capacitors each electrically connected to one of the pixel electrodes. Each of the storage capacitors is arranged above the corresponding thin film transistor so as to overlap at least a channel region of the thin film transistor in plan view of the substrate. The storage capacitors each include a lower electrode composed of a polysilicon film and an upper electrode composed of a dielectric film and a metal film stacked in this order from the bottom.

8 Claims, 10 Drawing Sheets

ELECTRO-OPTIC DEVICE, METHOD FOR FABRICATING THE SAME, AND ELECTRONIC APPARATUS

BACKGROUND

1. Technical Field

The present invention relates to electro-optic devices such as liquid crystal devices and methods for fabricating the same. Furthermore, the invention relates to a technical field of electronic apparatuses such as liquid crystal projectors provided with the electro-optic devices.

2. Related Art

One type of electro-optic device is an electro-optic device provided with pixel electrodes, scanning lines for selectively driving the pixel electrodes, data lines, and thin film transistors (TFTs) serving as pixel-switching elements on a substrate, and these elements are arranged so that active-matrix driving can be performed. In addition, storage capacitors may be formed between the TFTs and the pixel electrodes for achieving high-contrast imaging. These components are formed on a substrate at a high density for improving the pixel opening ratio and miniaturizing the device (for example, see JP-A-200-1156652).

Thus, electro-optic devices have been required to achieve higher-quality display and to be further miniaturized and densified. Therefore, various measures in addition to the above-mentioned methods have been taken. For example, a light leakage current generated when light enters a semiconductor layer of a TFT decreases the display quality. In order to increase light resistance of an electro-optic device, a light-shielding layer is disposed along the circumference of the semiconductor layer. Furthermore, a larger storage capacitor is preferable. However, electro-optic devices are preferably designed not to decrease their pixel opening ratio.

In the above-mentioned technologies, with an increase in function or performance, a stacked structure on a substrate becomes highly complicated. Furthermore, this results in a highly complicated fabricating process and a decrease in fabricating yield. On the other hand, simplification of a stacked structure on a substrate and of a fabricating process may cause a capacitance of the storage capacitor to be insufficient and a decrease in the light-shielding property. This may cause technological problems such as a decrease in display quality.

SUMMARY

An advantage of some aspects of the present invention is to provide an electro-optic device in which the capacitance of a storage capacitor is increased and, simultaneously, the light-shielding property is improved to allow high-quality image display, a method for fabricating the same, and further an electronic apparatus provided with such an electro-optic device.

In order to solve the above-mentioned problems, an electro-optic device according to an aspect of the invention includes a substrate, data lines and scanning lines extending so as to cross each other, pixel electrodes each arranged for one of a plurality of pixels defined by crossing of the data lines and the scanning lines in plan view of the substrate, thin film transistors each electrically connected to one of the pixel electrodes, and storage capacitors each electrically connected to one of the pixel electrodes. Each of the storage capacitors is arranged above the corresponding thin film transistor so as to overlap at least a channel region of the thin film transistor in plan view of the substrate. The storage capacitors each includes a lower electrode composed of a polysilicon film and an upper electrode composed of a dielectric film and a metal film stacked in this order from the bottom.

During the operation of the electro-optic device according to the invention, the thin film transistor applies a data signal from the data line to the pixel electrode in the pixel area selected by the scanning line, and thereby active-matrix driving can be performed. On this occasion, the storage capacitor electrically connected to the pixel electrode improves the electric potential retention property of the pixel electrode and, thereby, high-contrast image can be displayed.

In the invention, the storage capacitors each include a lower electrode composed of a polysilicon film and an upper electrode composed of a dielectric film and a metal film stacked in this order from the bottom. In other words, each of the storage capacitors has a metal-insulator-semiconductor (MIS) structure in which a semiconductor film, an insulating film, and a metal film are stacked in this order. Therefore, the pressure resistance of the storage capacitor can be increased and the occurrence of a leakage current can be suppressed or prevented by forming a high-temperature-deposited oxide (HTO) film on a top surface of the lower electrode by oxidizing the top surface or by stacking a dielectric film on the lower electrode and firing the dielectric film to improve the fineness. That is to say, since the lower electrode is composed of a polysilicon film, the melting of the lower electrode can be suppressed or prevented even if the lower electrode is subjected to oxidization or firing which are carried out at a relatively high temperature, unlike a case in which the lower electrode is composed of a metal film such as aluminum (Al).

In addition, the pressure resistance of the storage capacitor is increased by forming the lower electrode with a polysilicon film. Therefore, it is allowed to form the dielectric film with a high-dielectric-constant material (i.e., a high-k material) such as a silicon nitride film. That is to say, a leakage current negligibly occurs or does not occur at all even if the dielectric film is formed of a nigh-dielectric-constant material because the pressure resistance of the storage capacitor is increased by the oxidization, the formation of the high-temperature-deposited oxide film, or the firing, unlike a case in which the lower electrode is composed of a metal film. In other words, the capacitance of the storage capacitor can be increased by forming the dielectric film with a high-dielectric-constant material while securing the pressure resistance of the storage capacitor by the oxidization, the formation of the high-temperature-deposited oxide film, or the firing.

Furthermore, in the inventions each of the storage capacitors is arranged above the corresponding thin film transistor so as to overlap at least a channel region of the thin film transistor in plan view of a substrate. The upper electrode of each storage capacitor is composed of a metal film such as an aluminum film. Therefore, the channel region of the thin film transistor can be shielded from incident light from above by the upper electrode. The upper electrode may be composed of a monolayer or multilayer film composed of metals having a higher light-shielding property, such as titanium (Ti), titanium nitride (TiN), or tungsten (W), instead of aluminum. With such a structure, the channel region of the thin film transistor can be further surely shielded from light by the upper electrode.

Since each of the storage capacitors has an MIS structure as described above, the turn around time (TAT) of the storage capacitor can be shortened by the upper electrode composed of a metal film having a resistance lower than that of a polysilicon film, compared with a case in which both the upper electrode and the lower electrode of the storage capacitor are composed of a polysilicon film (i.e., a storage capacitor has a polysilicon-insulator-polysilicon (PIP) structure formed by stacking a polysilicon film, an insulating film, and a polysilicon film in this order). In addition, since the upper electrode of the storage capacitor is composed of a metal film, a capacitor line supplying a constant potential to the upper electrode can be integrally formed with the upper electrode. In other words, the upper electrode can also serve as a capacitor line. Here, if each upper electrode is formed of a WSi-polycide film, warpage and cracking occur in the upper electrode by a stress when the WSi-polycide film is heated for alloying. Consequently, it becomes difficult for the upper electrode to serve as an interconnection such as the capacitor line. However, in the invention, since each of the upper electrodes is composed of a metal film (i.e., a monolayer or multilayer of metals), warpage and cracking negligibly occur or do not occur at all. Therefore, the upper electrode and the capacitor line are not required to be electrically connected to a conductive film via a contact hole passing through an interlayer insulating film for insulating the conductive film that is arranged in a different layer. Thus, it is not necessary to form a redundant wiring structure such as double wiring for reducing the resistance or preventing a break of the upper electrode and the capacitor line. That is to say, the upper electrode may be used as single wiring. Therefore, the stacked structure can be relatively simplified. With such a structure, the fabricating yield can be increased and reliability of the device itself can be improved.

In an electro-optic device according to an embodiment of the invention, the optical density (OD) value of the metal film may be preferably higher than 4.

In accordance with this embodiment, the OD value of the metal film is higher than 4, namely, the light transmittance of the metal film is less than 0.01%. Therefore, the upper electrodes each composed of a metal film with a high light-shielding property can surely shield the channel region of the corresponding thin film transistor. In this connection, for example, the OD value of a WSi-polycide film is about 1.2 (i.e., the light transmittance is about 6.31%).

In an electro-optic device according to another embodiment of the invention, the upper electrode may contain a light-shielding metal.

In accordance with this embodiment, the upper electrode arranged near a channel region of the thin film transistor further securely shields the channel region from incident light from above. Consequently, the light leakage current in the thin film transistor can be decreased and thereby high-quality image display can be realized.

In the embodiment in which the upper electrode contains a light-shielding metal, the upper electrode may contain at least one of titanium nitride (TiN), titanium (Ti), and tungsten (W) as the light-shielding metal.

With such a structure, the upper electrode further surely shields the channel region of the thin film transistor from incident light from above. Consequently, the light leakage current in the thin film transistor can be decreased and thereby high-quality image display can be realized.

In an embodiment in which the upper electrode contains titanium nitride, the upper electrode may have a stacked structure composed of a first light-shielding layer of titanium nitride, a conductive layer of aluminum, and a second light-shielding layer of titanium nitride stacked in this order from the bottom.

With such a structure, the first and second light-shielding layers composed of titanium nitride further surely shield the channel region of the thin film transistor from incident light from above and, simultaneously, the conductive layer composed of aluminum decreases the resistance of the upper electrode.

An electro-optic device according to another embodiment of the invention, each of the storage capacitors is arranged below the corresponding data line.

In accordance with this embodiment, the storage capacitor can be arranged closer to the channel region of the thin film transistor. Therefore, the channel region of the thin film transistor is further surely shielded from incidents light from above by the metal film of the upper electrode.

In an electro-optic device according to another embodiment of the invention, the dielectric film contains at least one of silicon nitride (SiN), silicon oxide ($SiO_2$), tantalum oxide ($Ta_2O_5$), hafnium oxide ($HfO_2$), and alumina ($Al_2O_3$).

In accordance with this embodiment, the capacitance of the storage capacitor can be increased. In addition, the dielectric film may be composed of a material having a dielectric constant equal to or higher than that of silicon nitride. The dielectric film may be a monolayer film composed of a high-dielectric-constant material or a multilayer film composed of a plurality of high-dielectric-constant materials. Furthermore, the dielectric film may be a multilayer film composed of a high-dielectric-constant material and a material having a dielectric constant lower than that of the high-dielectric-constant material.

In an electro-optic device according to another embodiment of the invention, each of the storage capacitors is further provided with a high-temperature-deposited oxide film on a top surface of the lower electrode.

In accordance with this embodiment, a leakage current in the storage capacitor can be suppressed or prevented by a high-temperature-deposited oxide film formed by oxidizing a top surface of the lower electrode or laying an HTO film on a top surface of the lower electrode. That is to say, the pressure resistance of the storage capacitor can be increased.

In a method for fabricating an electro-optic device according to an aspect of the invention, in order to solve the above-mentioned problems, an electro-optic device including a substrate, data lines and scanning lines extending so as to cross each other, pixel electrodes each arranged for one of a plurality of pixels defined by crossing of the data lines and the scanning lines in plan view of the substrate, thin film transistors each electrically connected to one of the pixel electrodes, and storage capacitors each composed of a lower electrode, a dielectric film, and an upper electrode stacked in this order from the bottom thereof and each electrically connected to one of the pixel electrodes is fabricated. The method includes the steps of forming the scanning lines on the substrate, forming each of the thin film transistors at a region corresponding to an intersection of one of the data lines and one of the scanning lines in plan view of the substrate, forming each of the storage capacitors above one of the thin film transistors so as to overlap at least a channel region of the corresponding thin film transistor in plan view of the substrate by stacking the lower electrode composed of a polysilicon film and the upper electrode composed of a dielectric film and a metal film in this order from the bottom, forming each of the data lines so as to intersect the scanning lines in plan view of the substrate, and forming each of the pixel electrodes for each pixel so as to be electrically connected to the corresponding storage capacitor.

In accordance with the method for fabricating an electro-optic device according to an aspect of the invention, the above-described electro-optic device according to the invention can be fabricated. According to the invention, each of the storage capacitors is formed so as to have an MIS structure.

Therefore, the dielectric film can be formed with a high-dielectric-constant material while achieving high pressure resistance of the storage capacitor by oxidizing the lower electrode, forming an HTO film, or firing the dielectric film. Thus, the capacitance of the storage capacitor can be increased. Furthermore, the channel region of each thin film transistor can be shielded from light by the corresponding upper electrode. In addition, the upper electrode can be formed as single wiring. Therefore, the fabricating process can be relatively simplified and the fabricating yield can be improved.

In a method for fabricating an electro-optic device according to an aspect of the invention, the step of forming the storage capacitors further includes a step of oxidizing a top surface of the lower electrode before stacking the dielectric film.

In accordance with this embodiment, an HTO film is formed on the top surface of the lower electrode and thereby the pressure resistance of the storage capacitor can be increased.

In a method for fabricating an electro-optic device according to another aspect of the invention, the step of forming the storage capacitors further includes a step of firing the dielectric film before stacking the upper electrode.

In accordance with this embodiment, the fineness of the dielectric film is improved by the firing treatment without melting of the upper electrode composed of a metal film. Therefore, the pressure resistance of the storage capacitor can be increased.

In a method for fabricating an electro-optic device according to another aspect of the invention, the step of forming the storage capacitors uses an atomic layer deposition method for forming the dielectric film.

In accordance with this embodiment, since the dielectric film is formed by stacking a dielectric material by atomic layer deposition (ALD), a thinner dielectric film can be formed with high accuracy.

In a method for fabricating an electro-optic device according to another aspect of the invention, the method further includes a step of forming an interlayer insulating film on top surfaces of the upper electrodes by a low-temperature plasma chemical vapor deposition (CVD) method. The interlayer insulating film electrically insulates between the upper electrodes and the data lines.

In accordance with this embodiment, the interlayer insulating film may be formed, for example, using a tetraethyl orthosilicate (TEOS) gas by a low-temperature plasma CVD method such as a plasma-enhanced CARD (PECVD) method or a high-density plasma CVD (HDPCVD) method, which are carried out at a low temperature of lower than 500° C. Hence, heating to 500° C. or more is not required during the formation of the interlayer insulating film. Consequently, the lower electrode composed of a metal film negligibly melts or does not melt at all when the interlayer insulating film is formed.

In order to solve the above-mentioned problems, an electronic apparatus according to an aspect of the invention is provided with the above-described electro-optic device according to the invention.

Since the electronic apparatus according to the invention is provided with the electro-optic device according to the invention described above, the electronic apparatus can display high-quality images. Thus, in accordance with the invention, various electronic apparatuses such as a television, a mobile phone, an electronic personal organizer, a word processor, a viewfinder or monitor-direct-view video recorder, a workstation, a TV telephone, a POS terminal, and a touch-panel device that can display high-quality images are provided. Furthermore, image-forming apparatuses using electro-optic devices as the exposure heads, such as a printer, a copier, and a facsimile machine, which can display high-quality images, are provided. In addition, as electronic apparatuses according to the invention, electrophoretic apparatuses such as electronic paper and electron-emitter displays such as a field emission display and a conduction electron-emitter display can be provided.

The functions and advantages of the invention will be clarified by the embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
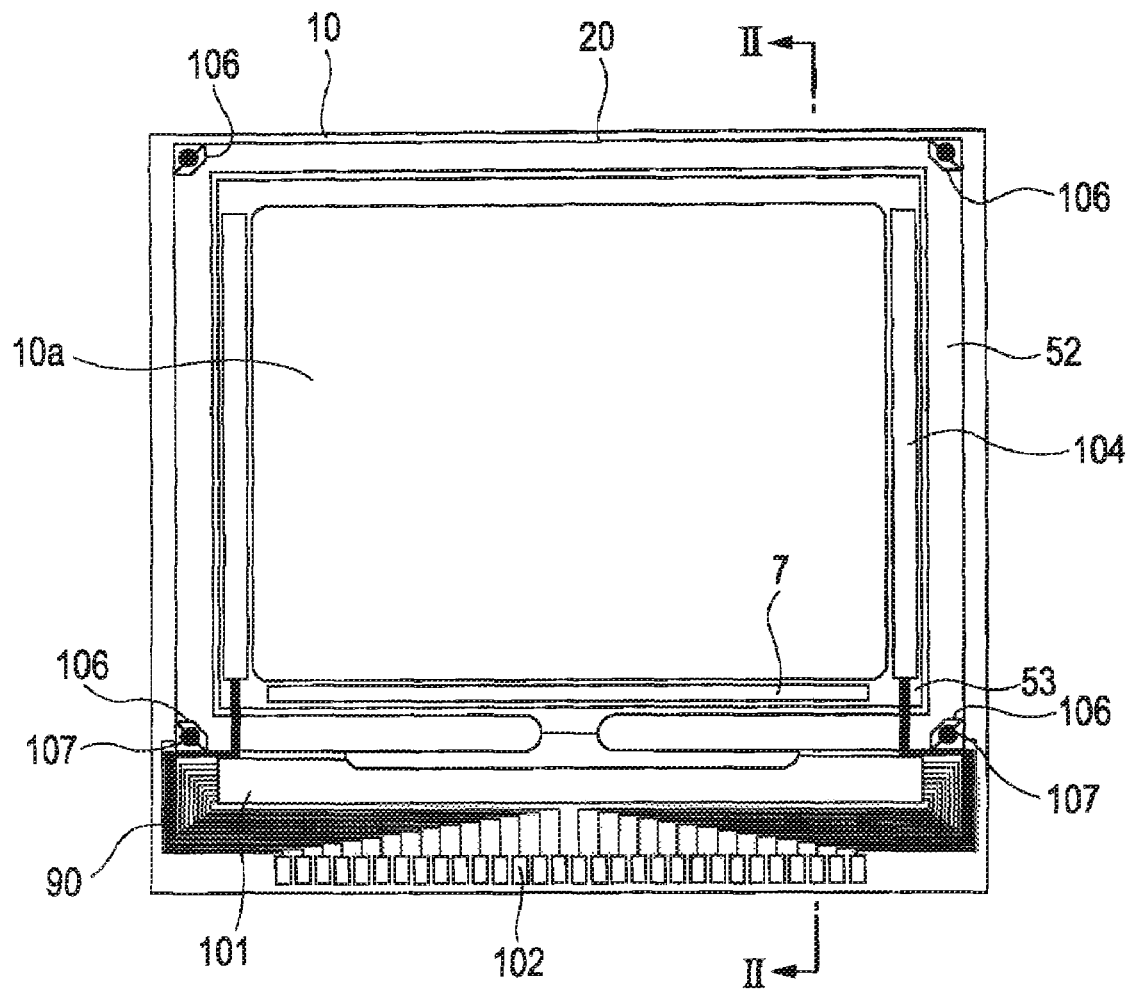
FIG. 1 is a plan view illustrating the entire configuration of a liquid crystal device according to a first embodiment of the invention.

Hereinafter, embodiments of the present invention will be described by referring to the drawings. In the embodiments described below, a TFT active-matrix driving type liquid crystal device having driving circuits is used as an example of the electro-optic device according to the invention.

First Embodiment liquid crystal device according to a first embodiment of the invention will be described with reference to FIGS. 1 to 6.

Figure 2:
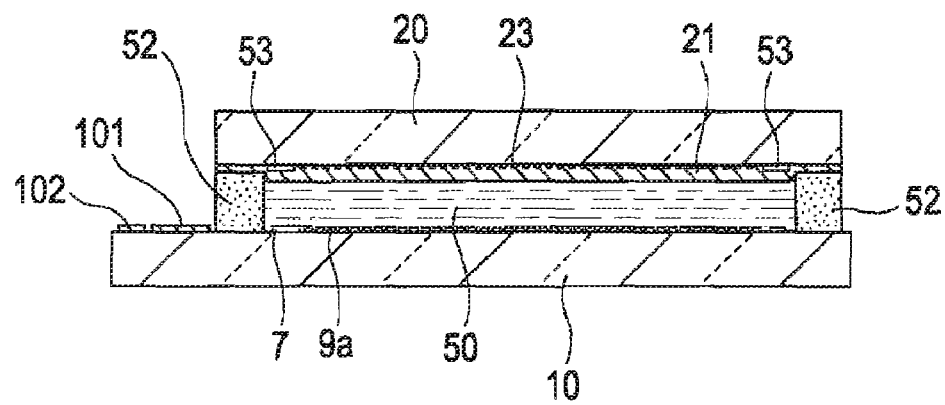
FIG. 2 is a cross-sectional view taken along the line II-II in FIG. 1.

First, the entire configuration of the liquid crystal device according to the embodiment will be described with reference to FIGS. 1 and 2. FIG. 1 is a plan view of the liquid crystal device according to the embodiment. FIG. 2 is a cross-sectional view taken along the line II-II of FIG. 1.

In the liquid crystal device according to the embodiment shown in FIGS. 1 and 2, a TFT array substrate 10 and a counter substrate 20 are arranged to oppose each other. A liquid crystal layer 50 is sealed between the TFT array substrate 10 and the counter substrate 20. The TFT array substrate 10 and the counter substrate 20 are bonded to each other with a sealing material 52 which is provided at a sealing region surrounding an image display region 10a.

In FIG. 1, the counter substrate 20 is provided with a frame-shaped light-shielding film 53 having a light-shielding property along an inner circumference of the sealing region where the sealing material 52 is disposed. The frame-shaped light-shielding film 53 defines a frame-shaped region of the image display region 10a. Among the regions surrounding the image display region 10a, in a region outside the sealing region where the sealing material 52 is arranged, a data-line-driving circuit 101 and external circuit-connecting terminals 102 are provided along a side of the TFT array substrate 10. In a region inside the sealing region, along this side, a sampling circuit 7 is provided so as to be covered with the frame-shaped light-shielding film 53. Further, scanning-line-driving-circuits 104 are provided along two sides adjacent to the side in such a manner that the scanning-line-driving-circuits 104 are covered with the frame-shaped light-shielding film 53. In addition, vertically conducting terminals 106 are disposed on the TFT array substrate 10 at regions opposing four corners of the counter substrate 20. The vertically conducting terminals 106 connect both substrates via a vertically disposed conducting material 107. With such a configuration, the TFT array substrate 10 and the counter substrate 20 are electrically conducted with each other.

Wiring lines 90 are provided on the TFT array substrate 10 for electrically connecting the external-circuit-connecting terminals 102 to the data-line-driving circuit 101, the scanning-line-driving circuits 104, and the vertically conducting terminals 106.

FIG. 2 illustrates a stacked structure formed on the TFT array substrate 10. The stacked structure includes pixel-switching TFTs as driving elements and wiring lines such as scanning lines and data lines. In the image display region 10a, pixel electrodes 9a are provided above the pixel-switching TFTs and the wiring lines such as the scanning lines and the data lines. A light-shielding film 23 is formed on a surface of the counter substrate 20 at the side facing the TFT array substrate 10. Further, a counter electrode 21 made of a transparent material such as indigo tin oxide (ITO) is formed on the light-shielding film 23 so as to oppose a plurality of pixel electrodes 9a. The liquid crystal layer 50 is composed of, for example, a liquid crystal mixture containing one or more nematic liquid crystals and is in a predetermined oriented state between the pair of oriented films.

Furthermore, although not show here, in addition to the data-line-driving circuit 101 and the scanning-line-driving-circuits 104, an inspection circuit or a pattern for inspecting the quality of or defects in the liquid crystal device during a fabrication process or before shipment may be formed on the TFT array substrate 10.

Figure 3:
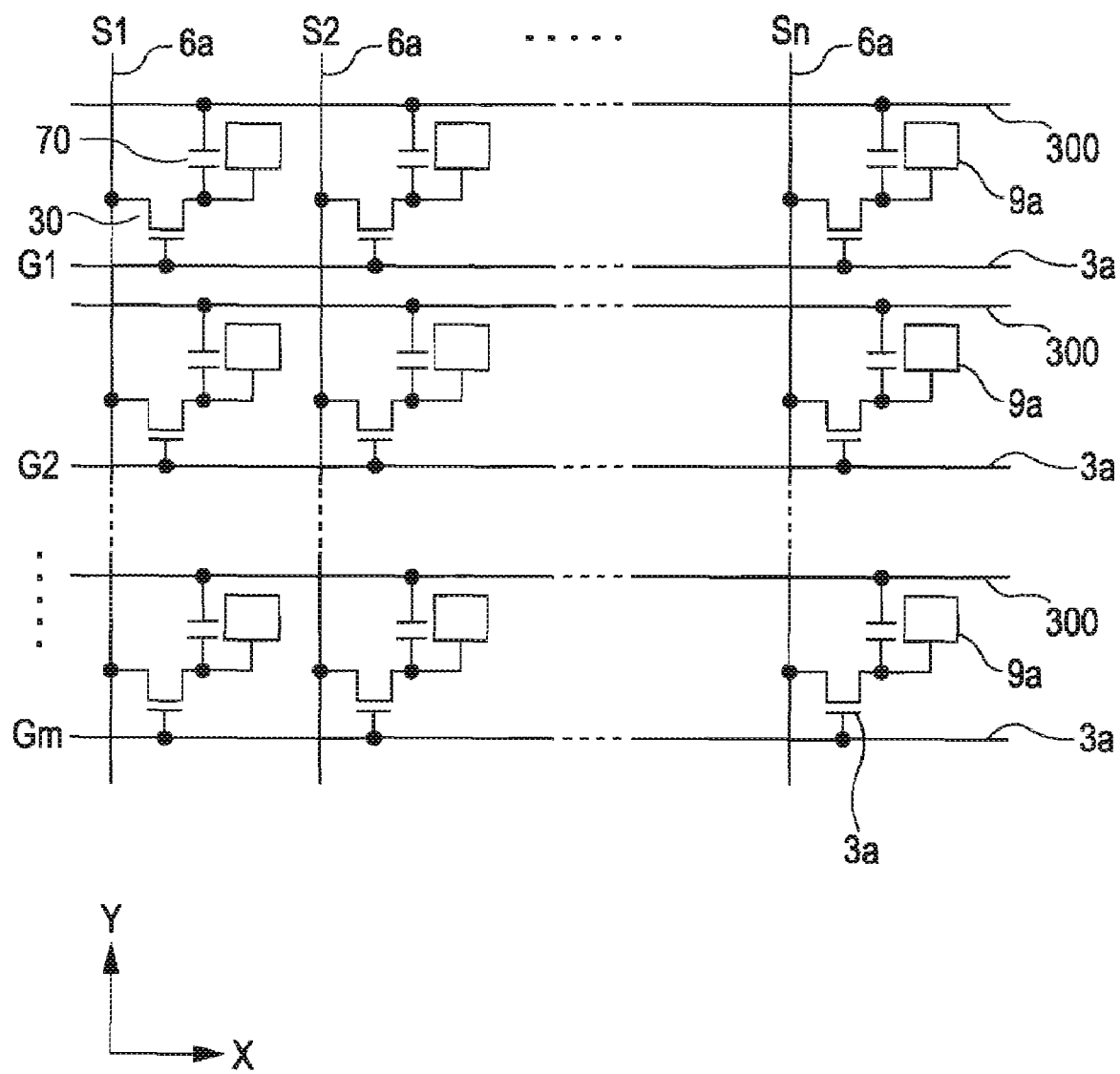
FIG. 3 is an equivalent circuit diagram illustrating various elements of pixels of a liquid crystal device according to the first embodiment of the invention.

Next, an electrical configuration of the pixel area of the crystal liquid device according to the embodiment will be described with reference to FIG. 3. FIG. 3 is an equivalent circuit diagram illustrating various elements and wiring lines of a plurality of pixels which are formed in a matrix constituting an image display region of the liquid crystal device.

In FIG. 3, the pixels arranged in a matrix constituting the image display region 10a (see FIG. 1) of the liquid crystal device according to the embodiment are each provided with a pixel electrode 9a and a TFT 30 for switching the pixel electrode 9a. A source of the TFT 30 is electrically connected to a data line 6a to which image signals S1, S3, . . . , Sn are supplied. The TFT 30 is an example of the "thin film transistor" according to the invention.

Further, a gate of the TFT 30 is electrically connected to a scanning line 3a so that scanning signals G1, G2, . . . , Gm are applied in pulses to the scanning line 3a at a predetermined timing in this line order. The pixel electrode 9a is electrically connected to a drain of the TFTs 30, and by closing the TFT 30, which serves as a switching element, for a predetermined period, the image signals S1, S2, . . . , Sn supplied from the data line 6a are written at a predetermined timing.

The image signals S1, S2, . . . , Sn with a predetermined level, which are supplied to the liquid crystal of the liquid crystal layer (see FIG. 2) via the pixel electrode 9a, are maintained for a predetermined period between the pixel electrode and the counter electrodes 21 formed on the counter substrate 20. The liquid crystal modulates light and allows display of a grayscale image by changing the alignment or order of molecular association according to an applied voltage level. In a normally white mode, transmittance with respect to incident light decreases according to the applied voltage for each pixel. In a normally black mode, transmittance with respect to incident light increases according to the applied voltage for each pixel. As a whole, light having a contrast corresponding to the image signal is emitted from the liquid crystal device.

Here, in order to prevent the maintained image signal from leaking, a storage capacitor 70 is provided in parallel with a liquid-crystal capacitor formed between the pixel electrode 9a and the counter electrode 21 (see FIGS. 1 and 2). The storage capacitor 70 is provided parallel with the scanning line 3a. The storage capacitor 70 has a fixed-potential-side capacitance electrode and a capacitor line 300 which is fixed at a predetermined potential. With this storage capacitor 70, the electric potential retention property of each pixel electrode is improved. The potential of the capacitor line 300 may be fixed at a predetermined voltage level constantly or may be fixed at a plurality voltage levels in an appropriate cycle.

Figure 4:
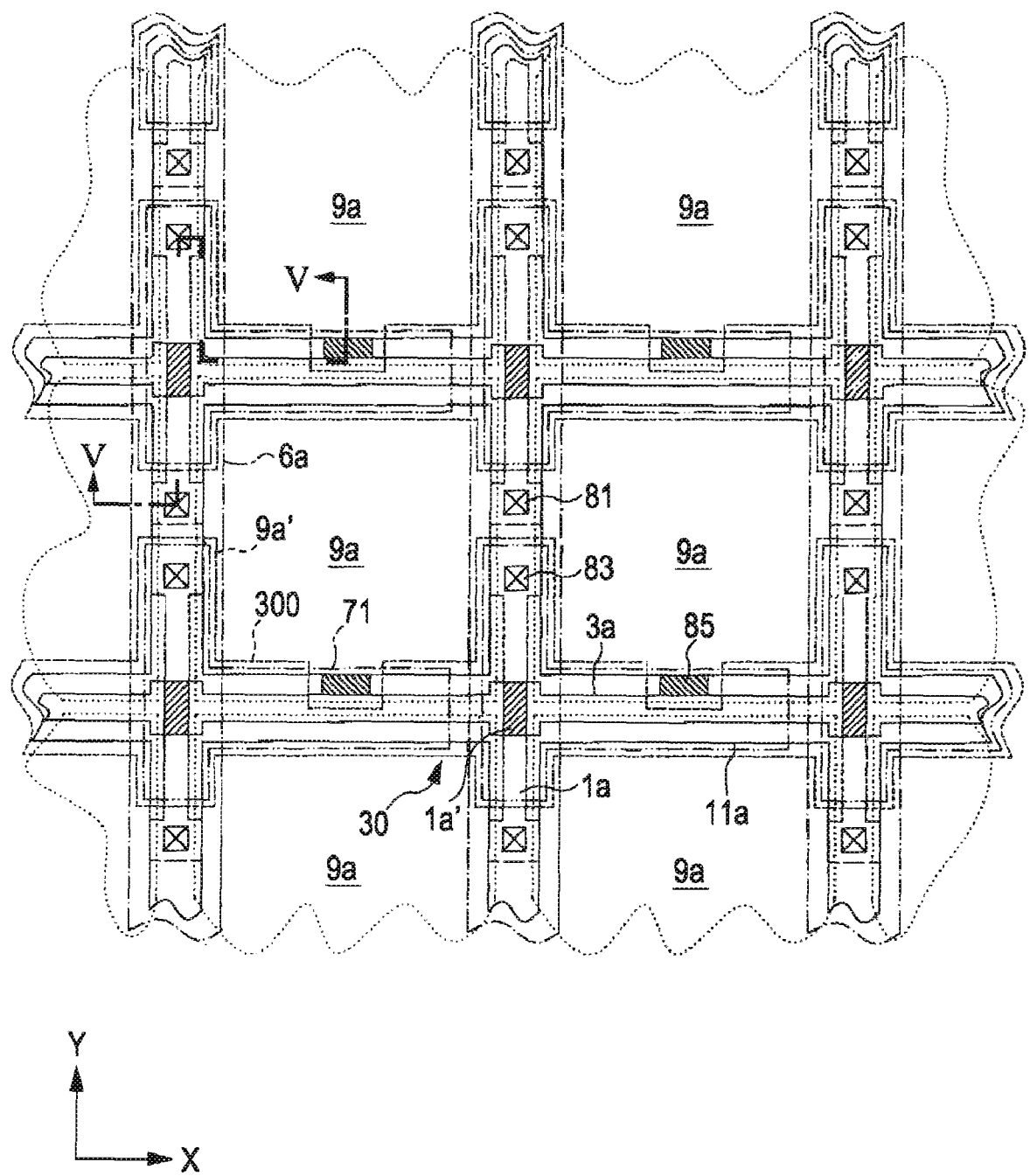
FIG. 4 is a plan view of a plurality of pixels adjacent to each other of a liquid crystal device according to the first embodiment of the invention.
Figure 5:
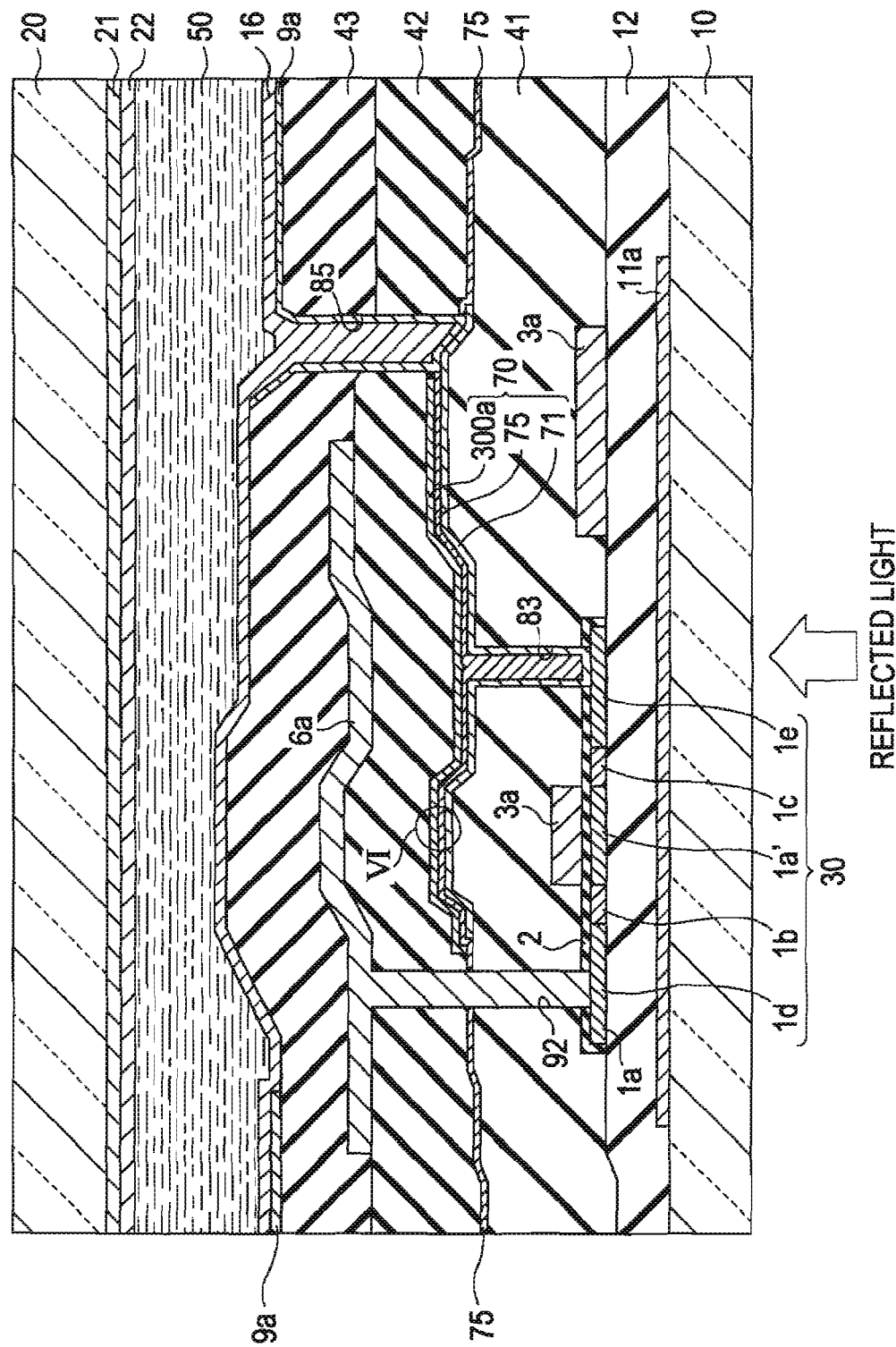
FIG. 5 is a cross-sectional view taken along the line V-V in FIG. 4.

Next, a configuration of the pixel area for realizing the above-described operation will be specifically described with reference to FIGS. 4 and 5. FIG. 4 is a plan view of a plurality of pixels disposed to be adjacent to one another on a TFT array substrate on which data lines, scanning lines, pixel electrodes of a liquid crystal device according to the embodiment are disposed. FIG. 5 is a cross-sectional view taken along the line V-V of FIG. 4.

In FIG. 4, the pixel electrodes 9a are disposed to form a matrix (the profile is defined by the dotted line 9a') on the TFT array substrate 10. Data lines 6a and scanning lines 3a are provided lengthwise and widthwise along boundaries between the adjacent pixel electrodes 9a. The data lines 6a are composed of a metal film or an alloy film of aluminum or the like. The scanning lines 3a are composed of a conductive film such as a polysilicon film. Each scanning line 3a is arranged so as to oppose a channel region 1a', which is indicated by lines slanting upward to the right in FIG. 4, of a semiconductor layer 1a, and serves as a gate electrode. That is to say, a pixel-switching TFT 30 is provided at each intersection of the scanning line 3a and the data line 6a, and the main line portion of the scanning line 3a is disposed so as to oppose the channel region 1a, as the gate electrode.

As shown in FIG. 5, the liquid crystal device according to the embodiment is provided with a transparent TFT array substrate 10 and a transparent counter substrate 20 arranged so as to oppose each other. The TFT array substrate 10 is a quartz substrate, a glass substrate, or a silicon substrate, for example. The counter substrate 20 is a glass substrate or a quartz substrate, for example. Above the TFT array substrate 10, a pixel electrode 9a is provided. On the upper surface of each pixel electrode 9a, an oriented film 16 subjected to a predetermined orientation treatment such as a rubbing treatment is provided. The pixel electrode 9a is made of, for example, a transparent conductive film such as an ITO film. On the counter substrate 20, a counter electrode 21 is disposed so as to cover the entirety of the counter substrate 20 and, on the bottom surface of the counter electrode 21, an oriented film 22 subjected to a predetermined orientation treatment such as a rubbing treatment is disposed. Among them, the counter electrode 21 is made of a transparent conductive film such as an ITO film, like the pixel electrode 9a. The oriented films 16 and 22 are made of a transparent organic film such as a polyimide film. The molecules of liquid crystal layer 50 are oriented in a predetermined state between the oriented films 16 and 22 when an electric field from the pixel electrode 9a is not applied.

As shown in FIG. 5, the TFT 30 has a lightly doped drain (LDD) structure. The LDD structure is composed of a scanning line 3a serving as a gate electrode described above; a channel region 1a' of a semiconductor layer 1a made of, for example, a polysilicon film in which the channel is formed by an electric field from the scanning line 3a; an insulating film 2 including a gate-insulating film for providing insulation between the scanning line 3a and the semiconductor layer 1a; and a low-concentration source region 1b, a low-concentration drain region 1c, a high-concentration source region 1d, and a high-concentration drain region 1e formed in the semiconductor layer 1a.

The TFT 30 preferably has an LDD structure as shown in FIG. 5, but may have an offset structure in which the low-concentration source region 1b and the low-concentration drain region 1c are not doped with an impurity. In addition, the TFT 30 may be a self-align-type TFT in which a high-concentration source region and a high-concentration drain region are formed in a self-aligning manner by doping a high-concentration impurity using a gate electrode composed of a part of the scanning line 3a as a mask. In this embodiment, a single-gate structure, in which one gate electrode of the pixel-switching TFT 30 is arranged between the high-concentration source region 1d and the high-concentration drain region 1e, is employed, but more than one gate electrode may be arranged between the high-concentration source region 1d and the high-concentration drain region 1e. By employing a multi-gate TFT, such as a dual-gate or triple-gate TFT, occurrence of a leakage current in junctions of a channel region and a source or drain region can be prevented and thereby an OFF current can be decreased. In addition, the semiconductor layer 1a constituting a TFT 30 may be either a non-single-crystal layer or a single-crystal layer. The single-crystal layer can be formed by a known method such as laminating. By employing a single-crystal layer as the semiconductor layer 1a, the properties of peripheral circuits can be particularly improved.

In FIG. 5, the storage capacitor 70 is disposed above the TFT 30 via a first interlayer insulating film 41. The storage capacitor 70 is formed by the lower electrode 71 being connected to the high-concentration drain region 1e of the TFT 30 and the pixel electrode 9a and the upper electrode 300a composed of a part of the capacitor line 300 being disposed so as to oppose each other with a dielectric film 75 therebetween.

The lower electrode 71 is made of a conductive polysilicon film and is electrically connected to the high-concentration drain region 1e of the TFT 30 via a contact hole 83 opened in the first interlayer insulating film 41. That is to say, the lower electrode 71 serves as a pixel-potential-side capacitance electrode having the pixel potential. The extending portion of the lower electrode 71 is electrically connected to the pixel electrode 9a via a contact hole 85 passing through a third interlayer insulating film 43 and a second interlayer insulating film 42. In other words, the lower electrode 71 has a function as an intermediary connection for electrically connecting the pixel electrode 9a and the high-concentration drain region 1e of the TFT 30 through the contact holes 83 and 85, in addition to a function as a pixel-potential-side capacitance electrode. Further, an HTO film is disposed on the lower electrode 71 as described below.

The interlayer insulating films 41, 42, and 43 are each made of, for example, non-doped silicate glass (NSG). The interlayer insulating films 41, 42, and 43 may be each made of silicate glass such as phospho-silicate glass (PSG), boro-silicate glass (BSG), and boro-phospho-silicate glass (BPSG); silicon nitride; or silicon oxide.

The dielectric film 75 is composed of a relatively thin silicon nitride (SiN) film having a thickness of about 5 to 300 nm. From the viewpoint of increasing the capacitance of the storage capacitor 70, a thinner dielectric film 75 is preferable as long as the film retains sufficient reliability. In addition, the dielectric film 75 is subjected to a firing treatment to increase fineness as described below.

The upper electrode 300a is formed as a part of the capacitor line 300 and serves as a fixed-potential-side capacitance electrode disposed so as to oppose the lower electrode 71. As shown in FIG. 4, the capacitor line 300 is formed at a region overlapping, in plan view, with the region where the scanning line 3a is formed. More specifically, the capacitor line 300 includes a main line portion extending along the scanning line 3a, a protruding portion extending from the intersection with the data line 6a upward, in the drawing, along the data line 6a, and a notch portion slightly notched at a portion corresponding to the contact hole 85. The protruding portion contributes to increasing the area for forming the storage capacitor 70 by using the region above the scanning line 3a and the region below the data line 6a. The capacitor line 300 extends from the image display region 10a, where the pixel electrodes 9a are arranged, to the periphery regions of the image display region 10a and is electrically connected to a constant-potential source so as to be at a constant potential. The constant-potential source may supply a positive or negative potential to the data-line driving circuit 101 or supply a counter electrode potential to the counter electrode 21 of the counter substrate 20, for example.

Figure 6:
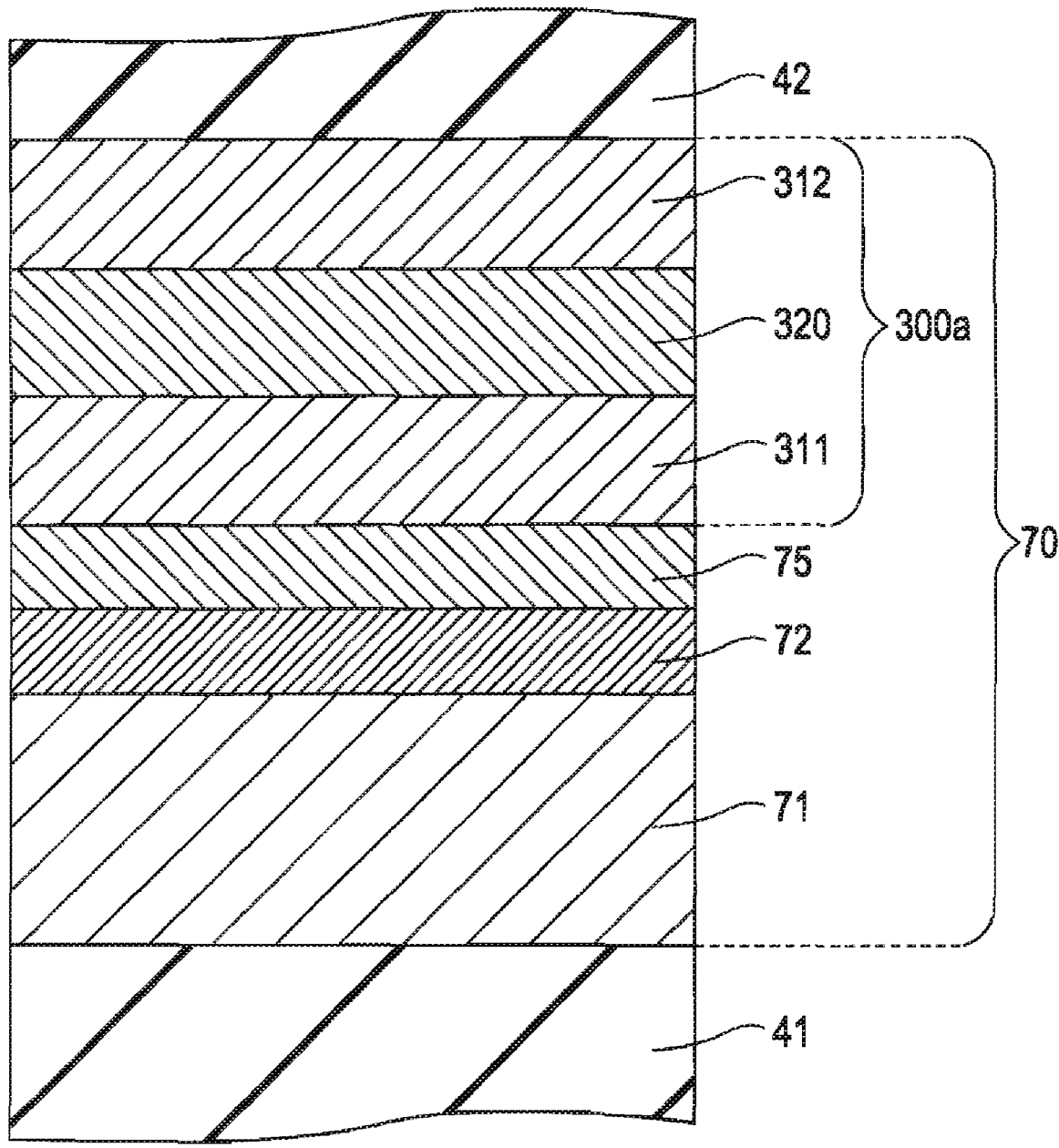
FIG. 6 is a partially enlarged cross-sectional view of a portion indicated by VI in FIG. 5.

The storage capacitor according to the embodiment will now be described in detail with reference to FIG. 6. FIG. 6 is a partially enlarged cross-sectional view of a portion indicated by VI in FIG. 5.

As shown in FIG. 6, the storage capacitor 70 includes a lower electrode 71, a dielectric film 75, and an upper electrode 300a stacked in this order from the bottom. In addition, an HTO film 72 is formed on the top surface of the lower electrode 71.

In this embodiment, the lower electrode 71 is made of a conductive polysilicon film, and the upper electrode 300a is made of aluminum. That is to say, the storage capacitor 70 has an MIS structure formed by stacking a semiconductor film, an insulating film, and a metal film in this order.

As shown in FIG. 6, in this embodiment, an HTO film 72 is formed on the top surface of the lower electrode 71. The HTO film 72 is a high-temperature-deposited silicon oxide film formed by oxidizing the top surface of the lower electrode 71 made of a polysilicon film or by a low-pressure CVD method. As a result of the thus-formed HTO film 72 between the lower electrode 71 and the dielectric film 75, the pressure resistance of the storage capacitor 70 is increased. That is to say, the occurrence of a leakage current in the storage capacitor 70 can be suppressed or prevented. In this embodiment, since the lower electrode 71 is made of a polysilicon film, the lower electrode 71 negligibly melts or does not melt at all even if the lower electrode 71 is subjected to oxidization which is carried out at a relatively high temperature, unlike a case in which the lower electrode 71 is made of a metal film such as aluminum. Therefore, an HTO film in which a leakage current is negligibly generated or is not generated at all can be formed on the top surface of the lower electrode 71 (i.e., on the bottom surface of the dielectric film 75).

Furthermore, in this embodiment, the fineness of the dielectric film 75 is increased by firing, namely, the pressure resistance of the storage capacitor 70 is increased. Therefore, the occurrence of a leakage current in the storage capacitor 70 can be suppressed or prevented. Here, in this embodiment, since the lower electrode 71 is made of a polysilicon film, the lower electrode 71 negligibly melts or does not melt at all even if the lower electrode 71 is fired at a relatively high temperature, unlike a case in which the lower electrode 71 is made of a metal film such as aluminum. Therefore, the dielectric film 75 can be fired to increase the pressure resistance of the storage capacitor 70.

In addition, in this embodiment, the dielectric film 75 is made of a SiN film, which is a high-dielectric-constant material (i.e., high-k material), as described above. In general, if a storage capacitor is constituted by a dielectric film having a high dielectric constant, pressure resistance is low and a leakage current is likely to occur. However, in this embodiment, since the pressure resistance is increased by the above-mentioned oxidization or firing, a leakage current negligibly occurs or does not occur at all even if the dielectric film 75 is made of a silicon nitride film, unlike a case in which the lower electrode 71 is composed of a metal film. In other words, in this embodiment, since the lower electrode 71 is made of a polysilicon film, the capacitance of the storage capacitor 70 can be increased by forming the dielectric film 75 with a silicon nitride film, which is a nigh-dielectric-constant material, while securing the pressure resistance of the storage capacitor 70 by the above-mentioned oxidization or firing. The dielectric film 75 may be a monolayer film or a multilayer film composed of a high-dielectric-constant material such as silicon oxide (SiO$_2$), tantalum oxide (Ta$_2$O$_5$), hafnium oxide (HfO$_2$), or alumina (Al$_2$O$_3$), instead of silicon nitride (SiN). Further, the dielectric film 75 may be a multilayer film composed of a high-dielectric-constant material and a material having a dielectric constant lower than that of the high-dielectric-constant material.

In FIG. 6, the upper electrode 300a (i.e., capacitor line 300) is a multilayer film having a stacked structure composed of a first light-shielding layer 311, a conductive layer 320, and a second light-shielding layer 312 stacked in this order from the bottom.

The first light-shielding layer 311 and the second light-shielding layer 312 are each made of a titanium nitride (TiN) film. The conductive layer 320 is made of an aluminum (Al) film.

As shown in FIG. 5, in this embodiment, the storage capacitor 70 is arranged above the TFT 30 so as to overlap at least the channel region 1a' of the TFT 30 in plan view of the TFT array substrate 10. Therefore, the channel region 1a, of the TFT 30 can be shielded from incident light from above by the upper electrode 300a composed of a metal film. In this embodiment, the upper electrode 300a includes the first light-shielding layer 311 and the second light-shielding layer 312 each composed of a TiN film with a high light-shielding property as described above. The OD value of the upper electrode 300a is higher than 4, namely, the light transmittance is less than 0.01%. Therefore, the channel region 1a, of the TFT 30 can be surely shielded from light, unlike a case in which the capacitor line 300 is made of a WSi-polycide film having an OD value of about 1.2 (i.e., the light transmittance is about 6.31%). Further, the first light-shielding layer 311 and the second light-shielding layer 312 may be each made of a titanium (Ti) film or a tungsten (W) film, instead of a TiN film. That is to say, the upper electrode 300a may be a three-layer film having a stacked structure composed of a Ti film, an Al film, and a Ti film stacked in this order or a stacked structure composed of a W film, an Al film, and a W film stacked in this order. In addition, the upper electrode 300a may have a simplified stacked structures namely, a two-layer film having a stacked structure in which any one of a TiN film, a Ti film, and a W film and an Al film are stacked.

Furthermore, in this embodiment, since the storage capacitor 70 has an MIS structure as described above, the turn around time (TAT) of the storage capacitor 70 can be shortened due to the upper electrode 300a made of a metal film having a resistance lower than that of a polysilicon film, compared with a case in which the both the upper electrode 300a and the lower electrode 71 of the storage capacitor 70 are made of a polysilicon film (i.e., a storage capacitor 70 has a PIP structure formed by stacking a polysilicon film, an insulating film, and a polysilicon film in this order). In addition, since the upper electrode 300a of the storage capacitor 70 is made of a metal film, the upper electrode 300a can be integrally formed with the capacitor line 300. That is to say, the upper electrode 300a can also serve as a capacitor line 300. If the upper electrode 300a is made of, for example, a WSi-polycide film, when the WSi-polycide film is heated for alloying, a stress due to the alloying is applied to the WSi-polycide film and thereby warpage and cracking occur in the upper electrode 300a. Consequently, it becomes difficult for the upper electrode 300a to serve as a capacitor line 300. However, in this embodiment as described by referring to FIG. 6, since the upper electrode 71 is made of a metal film, warpage and cracking negligibly occur or do not occur at all. Therefore, the upper electrode 300a and the capacitor line 300 are not required to form a redundant wiring structure such as double wiring for reducing the resistance or preventing a break of the upper electrode 300a and the capacitor line 300, namely, it is not necessary to electrically connect the upper electrode 300a and the capacitor line 300 to a conductive film via a contact hole passing through an interlayer insulating film for insulating the conductive film arranged in a different layer. That is to say, the upper electrode 300a (or the capacitor line 300) may be used as single wiring. Therefore, the stacked structure on the TFT array substrate 10 can be relatively simplified. With such a structure, the fabricating yield can be increased and reliability of the liquid crystal device itself can be improved.

As shown in FIG. 5, in this embodiment, the storage capacitor 70 is arranged below the corresponding data line 6a de-scribed below. That is to say, the storage capacitor 70 is arranged further closer to the channel region 1a', of the TFT 30. Therefore, the channel region 1a, of the TFT 30 can be further surely shielded from incident light from above by the upper electrode 300a including the first light-shielding layer 311 and the second light-shielding layer 312.

With reference to FIGS. 4 and 5, a lower light-shielding film 11a is disposed below the TFT 30. The lower light-shielding film 11a is patterned in a lattice, thereby defining the aperture region of each pixel. Furthermore, the lower light-shielding film 11a shields the channel region 1a', of the TFT 30 from reflected light from below, such as backsurface reflection of the TFT array substrate 10 and light that is emitted from another liquid crystal device of a double plate projector and passes through a synthetic optical system. The lower light-shielding film 11a is composed of a monolayer film or a multilayer film containing a metal or an alloy. The aperture region is also defined by the data line 6a and the capacitor line 300 that intersects the data line 6a in FIG. 4. Furthermore, the lower light-shielding film 11a also extends from the image display region 10a to the periphery regions thereof and is connected to a constant potential source in order to avoid negative influence on the TFT 30 by a change in the electric potential, as in the capacitor line 300 described above.

As thus described above, in the liquid crystal device according to the embodiment, since the storage capacitor 70 has an MIS structure, the pressure resistance can be increased by firing the dielectric film 75 or oxidizing the lower electrode 71. Thus, the occurrence of a leakage current can be suppressed or prevented. In addition, the capacitance of the storage capacitor 70 can be increased by using a high-dielectric-constant material. As a result, flickering and unevenness in pixels are decreased or, preferably, eliminated and thereby high-quality images can be displayed.

Fabrication Method

Figure 7:
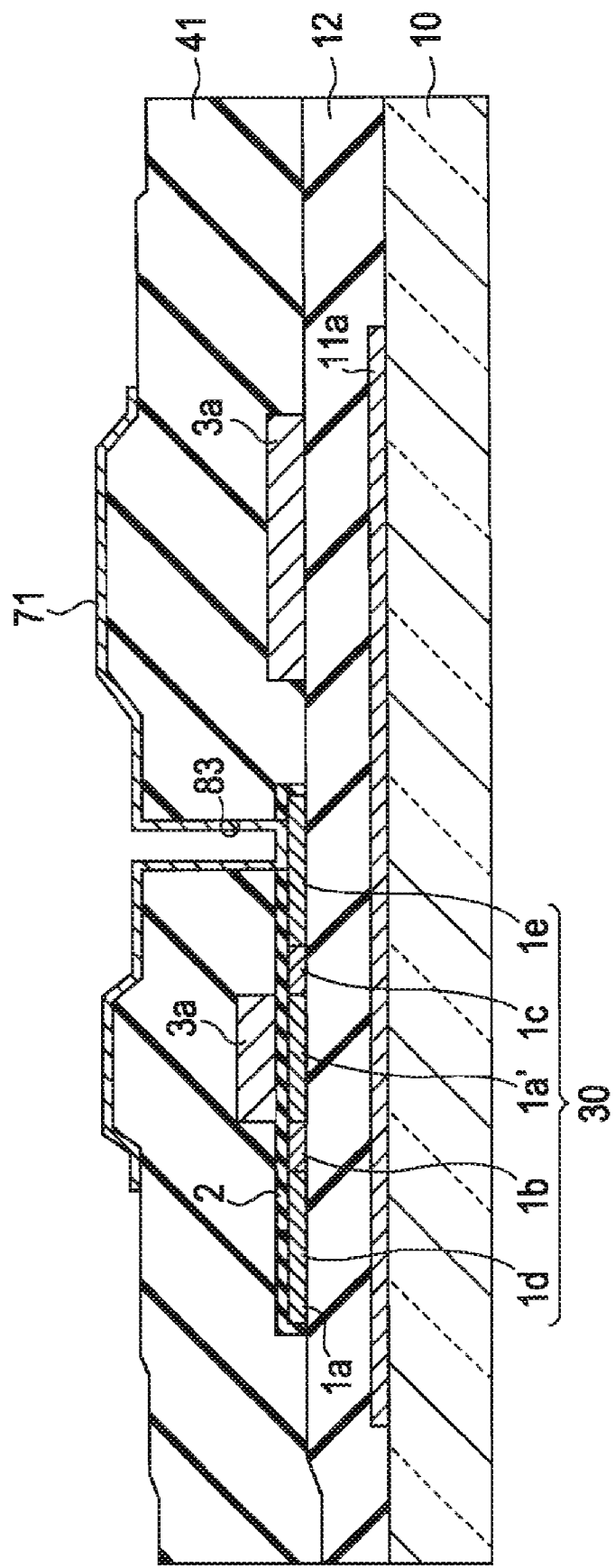
FIG. 7 is a diagram showing a cross-sectional configuration (1) of the liquid crystal device according to the first embodiment of the inventions in relation to a series of fabrication steps.
Figure 8A:
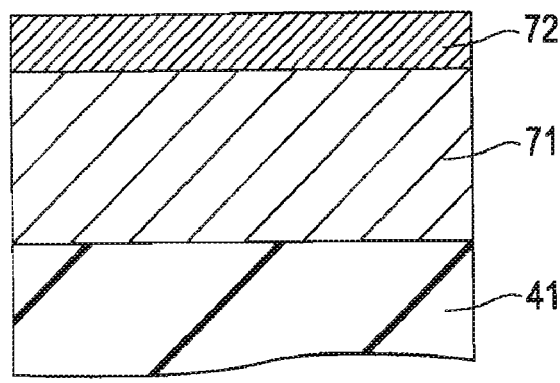
FIGS. 8A to 8C are diagrams each showing a cross-sectional configuration (2) of the storage capacitor of the liquid crystal device according to the first embodiment of the invention, in relation to a series of fabrication steps.
Figure 8B:
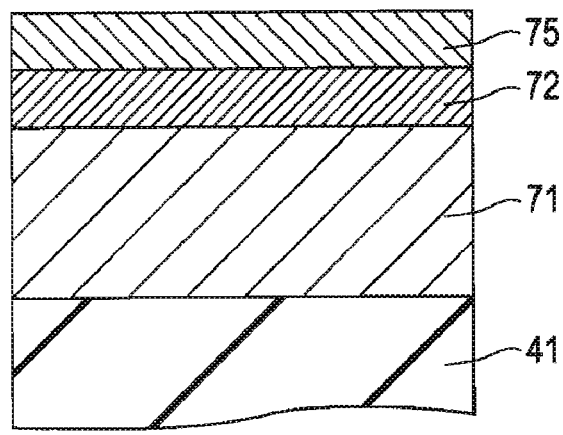
Figure 8C:
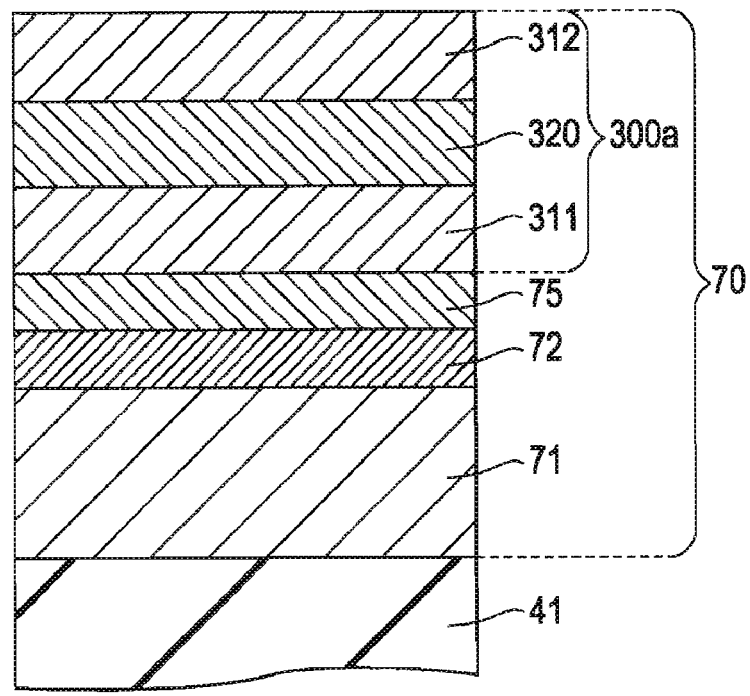
Figure 9:
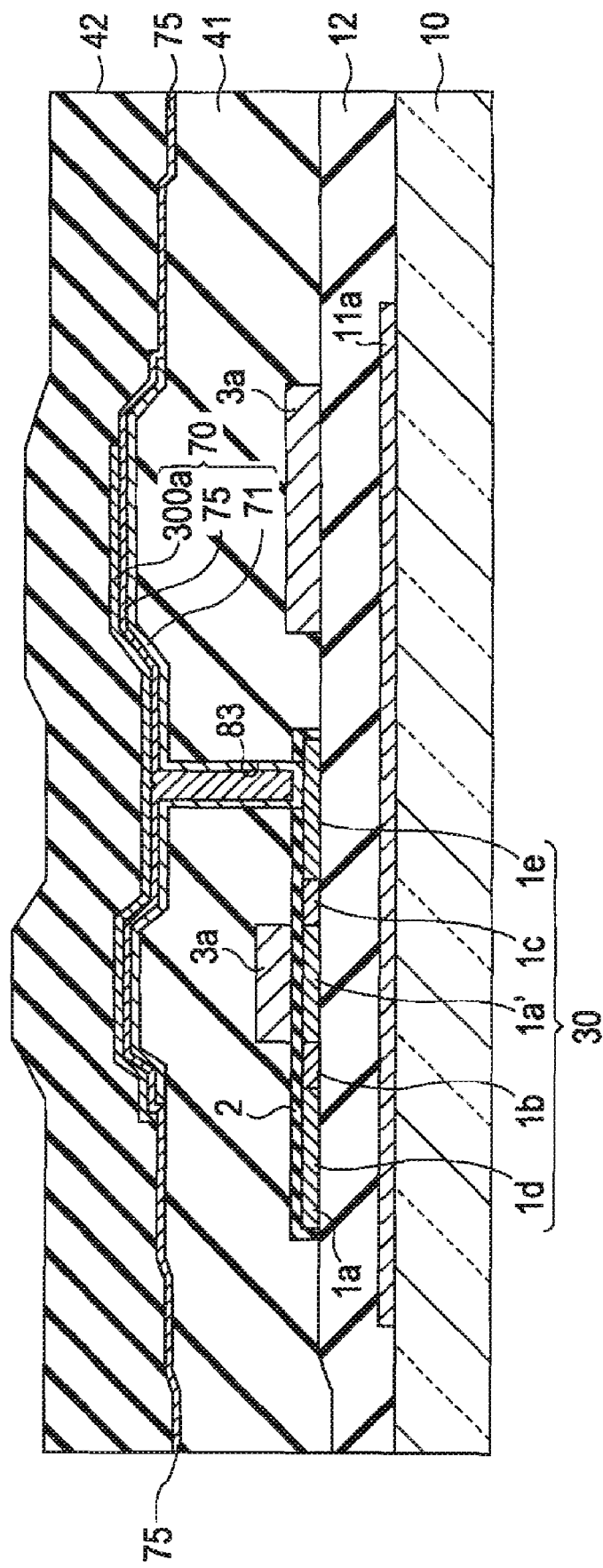
FIG. 9 is a diagram showing a cross-sectional configuration (3) of the liquid crystal device according to the first embodiment of the invention, in relation to a series of fabrication steps.
Figure 10:
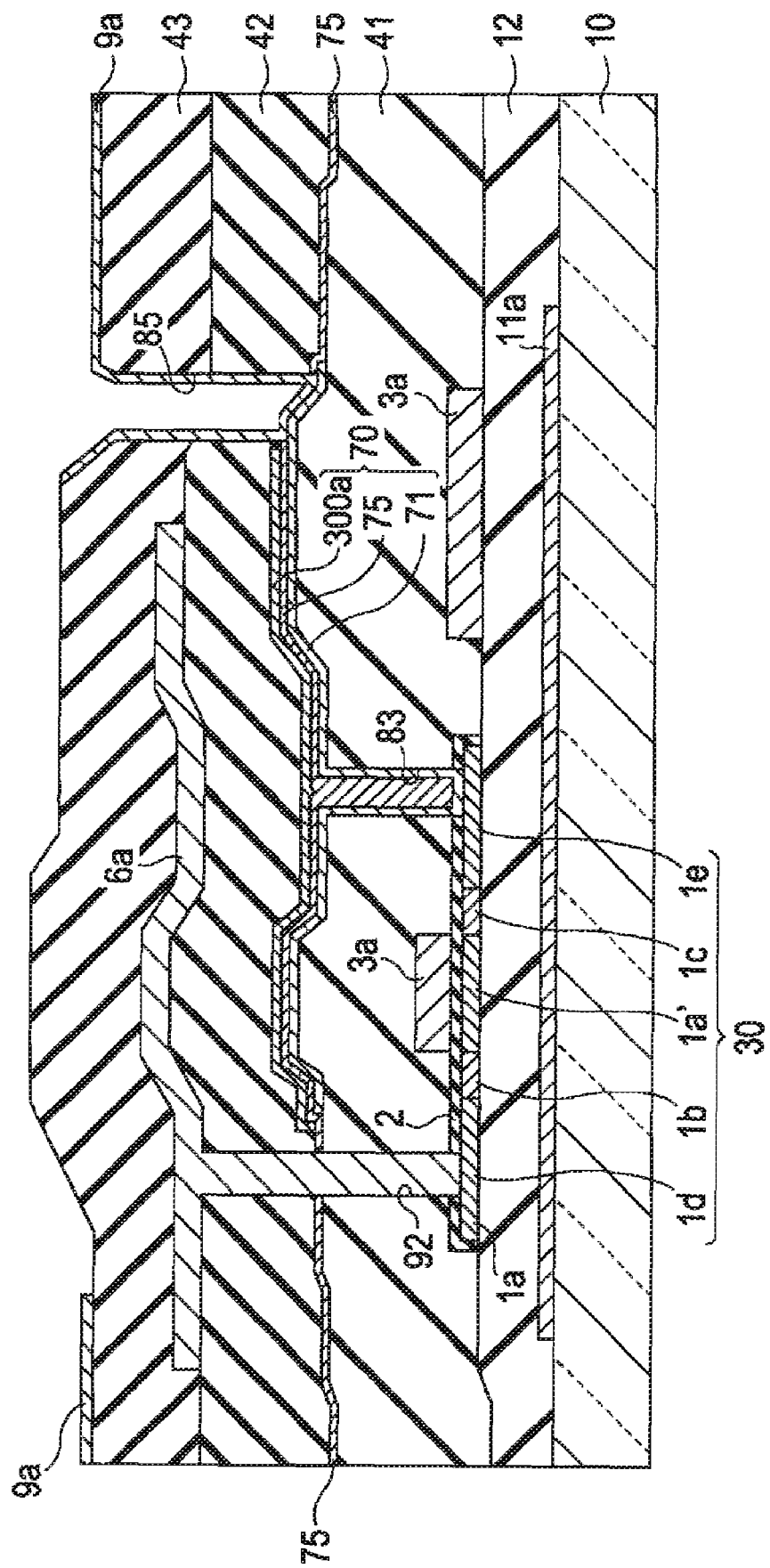
FIG. 10 is a diagram showing a cross-sectional configuration (4) of the liquid crystal device according to the first embodiment of the invention, in relation to a series of fabrication steps.

A method for fabricating the liquid crystal device according to the above-described embodiment will now be described with reference to FIGS. 7 to 10. FIGS. 7 to 10 are diagrams showing a cross-sectional configuration of the liquid crystal device according to the embodiments in relation to a series of fabrication steps. FIGS. 7, 9, and 10 show views that correspond to the cross-sectional views of a pixel area shown in FIG. 5. FIGS. 8A to 8C are views that correspond to the partially enlarged cross-sectional views of a storage capacitor shown in FIG. 6. Here, a process for fabricating a storage capacitor of the liquid crystal device according to the embodiment will be mainly described.

First, as shown in FIG. 7, in an image display region 10a, each layer from a lower light-shielding film 11a to a first interlayer insulating film 41 are formed on a TFT array substrate 10. On this occasion, the lower light-shielding film 11a is patterned in a lattice. A base insulating film 12 and a first interlayer insulating film 41 are formed so as to cover the entire area of the TFT array substrate 10. The base insulating film 12 is formed of a silicate glass film such as NSG, PSG, or BSG, a nitride film, or a silicon oxide film by an atmospheric pressure or reduced pressure CVD method using a tetraethyl orthosilicate (TEOS) gas, a tetraethyl borate (TEB) gas, or a tetramethyl oxophosrate (TMOP) gas. The thickness of the base insulating film 12 is, for example, about 500 to 2000 nm, preferably about 800 mm. A TFT 30 is formed at a region corresponding to an intersection of the scanning line 3a and the data line 6a that is formed later. In the process for forming the TFT 30, an annealing treatment or a heating treatment for annealing is carried out to improve properties of the TFT 30. The temperature for the annealing on this occasion is about 900° C. to 1300° C., preferably about 1000° C. The first interlayer insulating film 41 is formed of a silicate glass film such as NSG, PSG, or BSG, a nitride film, or a silicon oxide film by an atmospheric pressure or reduced pressure CND method using a TEOS gas, a TEB gas, or a TMOP gas. The thickness of the first interlayer insulating film 41 is, for example, about 500 to 2000 nm, preferably about 800 nm. On this occasion, preferably, an annealing treatment at a high temperature of about 800° C. is carried out to improve the quality of the first interlayer insulating film 41. Each process can be conducted by known semiconductor integration technology. In addition, the surface of the first interlayer insulating film 41 may be planarized by chemical mechanical polishing (CMP).

Then, a contact hole 83 is formed at a predetermined position of the surface of the first interlayer insulating film 41 by etching so that the contact hole 83 reaches the high-concentration drain region 1e. Then, a lower electrode 71 is formed on the first interlayer insulating film 41 by forming a conductive polysilicon film having a predetermined pattern. The lower electrode 71 is connected to the high-concentration drain region 1e through the contact hole 83.

Next, as shown in FIG. 8A, an HTO film 72 made of a high-temperature-deposited silicon oxide film is formed on the ton surface of the lower electrode 71 composed of a polysilicon film by oxidizing the surface of the lower electrode 71 or a LP-CVD method.

Then, as shown in FIG. 8B, a dielectric film 75 is formed on the HTO film 72 by forming a SiN film by an atomic layer deposition (ALD) method. On this occasion, in this embodiment, the dielectric film 75 is subjected to a firing treatment. Therefore, the fineness of the dielectric film 75 can be improved and the pressure resistance of the storage capacitor 70 can be increased. In addition, in this embodiment, since the dielectric film 75 is formed by depositing a dielectric material by the ALD method, the dielectric film 75 can be formed thinner and with higher precision. In accordance with this embodiment, the pressure resistance of the storage capacitor is increased by the formation of the HTO film 72 and firing of the dielectric film 75, a leakage current negligibly occurs or preferably does not occur at all even if the dielectric film 75 is thin. That is to say, a storage capacitor with high pressure resistance and large capacitance can be formed. The dielectric film 75 may be composed of a monolayer or multilayer film of a high-dielectric-constant material such as $SiO_2$, $Ta_2O_5$, $HfO_2$, or $Al_2O_3$, instead of SiN. In addition, the dielectric film 75 may be a multilayer film composed of a high-dielectric-constant material and a material having a dielectric constant lower than that of the high-dielectric-constant material.

Then, as shown in FIG. 8C, an upper electrode 300a (or capacitor line 300) having a predetermined pattern is formed. That is to say, first, a first light-shielding layer 311 of a TiN film having a predetermined pattern is formed on the dielectric film 75. Then, a conductive layer 320 of an Al film with a predetermined pattern is formed on the first light-shielding layer 311. Then, a second light-shielding layer 312 of a TiN film having a predetermined pattern is formed on the conductive layer 320. On this occasion, the predetermined pattern of the upper electrode 300a is formed so as to overlap at least the channel region 1a' of the TFT 30 in plan view of the TFT array substrate 10. Therefore, the channel region 1a' of the TFT 30 can be surely shielded from light by the upper electrode 300a containing the first light-shielding layer 311 and the second light-shielding layer 312.

Then, as shown in FIG. 9, in this embodiments a second interlayer insulating film 42 made of a silicate glass film, such as NSG, PSG, or BSG, is formed by, for example, a plasma CVD method performed at a temperature lower than 500° C. using a TEOS gas above the entire area of the TFT array substrate 10. The thickness of the second interlayer insulating film 42 is, for example, about 400 nm. Thus, a heating treatment to a temperature higher than 500° C. is not necessary for forming the second interlayer insulating film 42. Therefore, the upper electrode 300a (or capacitor line 300) composed of a metal film negligibly melts or preferably does not melt at all when the second interlayer insulating film 42 is formed. The second interlayer insulating film 42 may be formed by a high-density plasma CVD method. Furthermore, the surface of the second interlayer insulating film 42 may be planarized by CMP.

Then, as shown in FIG. 10, a contact hole 92 is formed by etching a predetermined position of the surface of the second interlayer insulating film 42 so as to reach the high-concentration source region 1d. Next, a data line 6a of an aluminum film having a predetermined pattern is formed. The data line 6a is connected to the high-concentration source region 1d through the contact hole 92.

Then, a third interlayer insulating film 43 made of BPSG is formed above the entire area of the TFT array substrate 10. The thickness of the third interlayer insulating film 43 is, for example, about 500 to 1500 nm, preferably about 800 nm. The third interlayer insulating film 43 may be formed of silicate glass such as NSG, PSG, or BSG; silicon nitride; or silicon oxide. Furthermore, the surface of the third interlayer insulating film 43 may be planarized by CMP.

Then, a contact hole 85 is formed by etching a predetermined position of the surface of the third interlayer insulating film 43 so as to reach the extending portion of the lower electrode 71. Next, a pixel electrode 9a of a transparent conductive film, such as an ITO film, with a predetermined pattern is formed. The pixel electrode 9a is connected to the extending portion of the lower electrode 71 through the contact hole 85. Consequently, the pixel electrode 9a is electrically connected to the high-concentration drain region 1e via the extending portion of the lower electrode 71.

In accordance with the method described above, a liquid crystal device according to the above-described embodiment can be fabricated. In the embodiment, since the storage capacitor 70 has an MIS structure, the dielectric film 75 can be formed with a high-dielectric-constant material while securing the pressure resistance of the storage capacitor 70 by oxidization of the lower electrode 71, formation of an HTO film, or firing of the dielectric film 75. Therefore, the capacitance of the storage capacitor 70 can be increased. Furthermore, the channel region 1a, of the TFT 30 can be shielded from light by the upper electrode 300a. In addition, the upper electrode 300a can be formed as single wiring. Thus, the fabrication process can be relatively simplified, and the fabrication yield can be improved.

Electronic Apparatus

Application of the above-mentioned liquid crystal device to various electronic apparatuses as an electro-optic device will be described.

Figure 11:
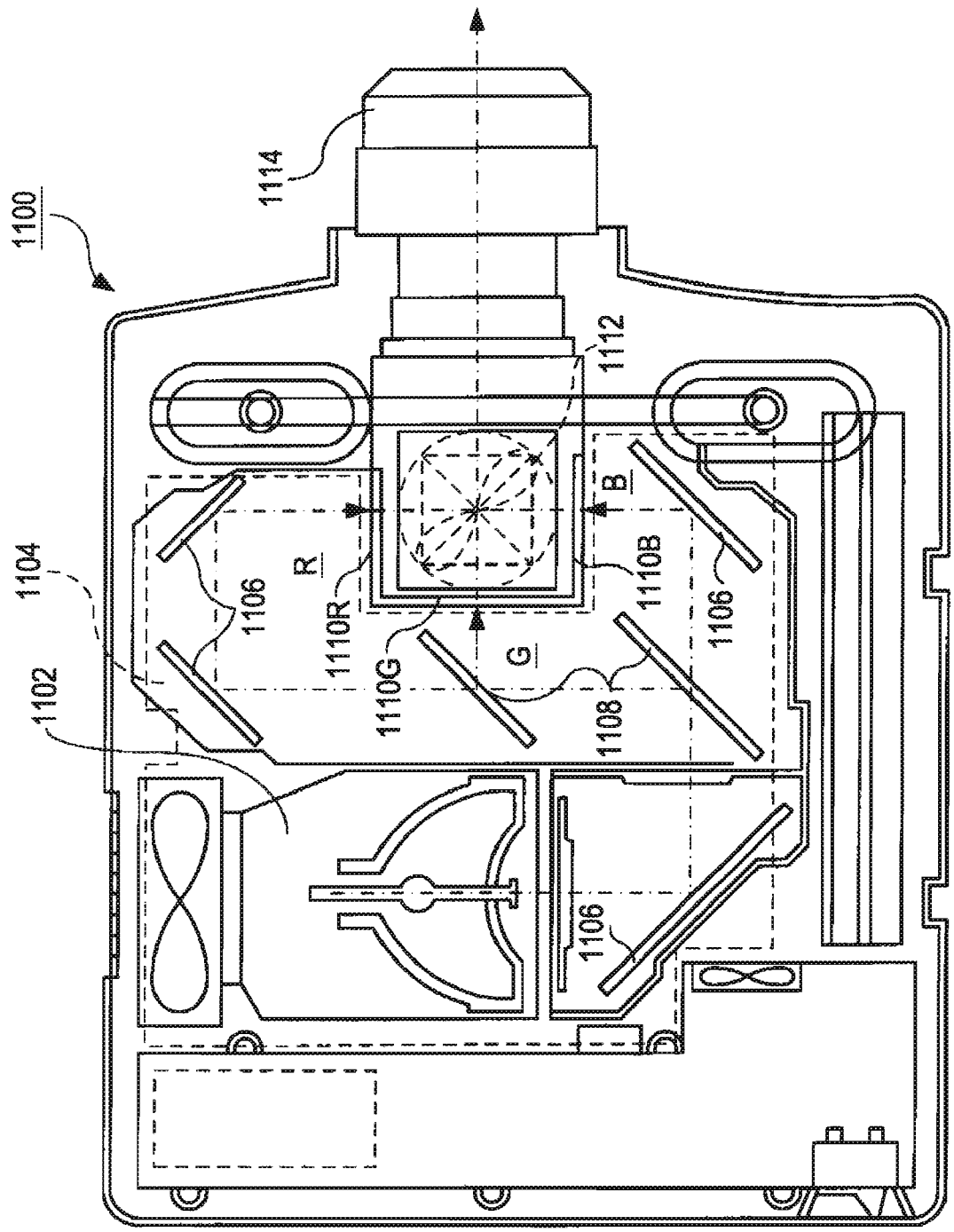
FIG. 11 is a plan view showing a structure of a projector that is an electronic apparatus applied with an electro-optic device according to the invention.

A projector using this liquid crystal device as a light valve will now be described. FIG. 11 is a plan view illustrating a configuration example of a projector. As shown in FIG. 11, a lamp unit 1102 having a white-light source such as a halogen lamp is disposed inside the projector 1100. Projection light is emitted from the lamp unit 1102 is divided into three primary colors of red, green, and blue by four mirrors 1106 and two dichroic mirrors 1108 arranged in a light guide 1104. The divided light rays enter liquid crystal panels 1110R, 1110G, and 1110B serving as light valves corresponding to the primary colors.

The configurations of the liquid crystal panels 1110R, 1110G, and 111B are equivalent to that of the above-described liquid crystal device. The liquid crystal panels are driven by the respective primary color signals R, G, and B supplied from an image signal processing circuit. The light rays modulated in these liquid crystal panels enter a dichroic prism 1112 from three directions. In the dichroic prism 1112, while the light R and light B are refracted 90 degrees, the light G advances straight. Therefore, the respective color images are composed and thereby a color image is projected onto a screen through a projection lens 1114.

Here, in images displayed by the respective liquid crystal panels 1110R, 1110G, and 1110B, the image displayed by the liquid crystal panel 1110G is required to be a mirror-reversed image with respect to the images displayed by the liquid crystal panels 1110R and 1110B.

In addition, since three primary color light rays R, G, and B enter the respective liquid crystal panels 1110R, 1110G, and 1110B by means of the dichroic mirror 1108, color filters are not necessary.

Furthermore, it should be understood that, in addition to the electronic apparatus described with reference to FIG. 11, the invention can be applied to various electronic apparatuses such as a mobile personal computer, a mobile phone, a liquid crystal television, a viewfinder or monitor-direct-view video recorder, a car navigation apparatus, a pager, an electronic personal organizer, a desk-top calculator, a word processor, a workstation, a TV telephone, a POS terminal, and a touch-panel device.

The present invention has been described above but is not limited to the above-described embodiments and can be properly modified within the scope not departing from the gist or the spirit of the invention readable from the claims and the entire specification. Electro-optic devices provided with such modifications, methods for fabricating the electro-optic devices, and electronic apparatuses provided with the electro-optic devices are also included in the technical scope of the present invention.

The entire disclosure of Japanese Patent Application No. 2006-001449, filed Jan. 6, 2006 is expressly incorporated by reference herein.

What is claimed is:

1. An electro-optic device comprising:
   a substrate;
   data lines and scanning lines extending so as to cross each other;
   pixel electrodes each arranged for one of a plurality of pixels defined by crossing of the data lines and the scanning lines in plan view of the substrate;
   thin film transistors each electrically connected to one of the pixel electrodes; and
   storage capacitors each electrically connected to one of the pixel electrodes, each of the storage capacitors being arranged above the corresponding thin film transistor so as to overlap at least a channel region of the thin film transistor in plan view of the substrate, each of the storage capacitors including a lower electrode composed of a polysilicon film, and a dielectric film, and an upper electrode composed of a metal film, stacked in this order from the bottom,
   each of the upper electrodes has a stacked structure composed of a first light-shielding layer of titanium nitride, a conductive layer of aluminum, and a second light-shielding layer of titanium nitride stacked in this order from the bottom.

2. The electro-optic device according to claim 1, wherein the optical density value of the metal film is higher than 4.

3. The electro-optic device according to claim 1, wherein each of the upper electrodes contains a light-shielding metal.

4. The electro-optic device according to claim 1, wherein each of the storage capacitors is arranged below the corresponding data line.

5. The electro-optic device according to claim 1, wherein each of the dielectric films contains at least one of hafnium, oxide and alumina.

6. The electro-optic device according to claim 1, wherein each of the storage capacitors further includes a high-temperature-deposited oxide film on the top surface of the lower electrode.

7. The electro-optic device according to claim 1, the metal film being stacked directly on top of the dielectric film.

8. An electro-optic device comprising:
a substrate;
data lines and scanning lines extending so as to cross each other;
pixel electrodes each arranged for one of a plurality of pixels defined by crossing of the data lines and the scanning lines in plan view of the substrate;
thin film transistors each electrically connected to one of the pixel electrodes; and
storage capacitors each electrically connected to one of the pixel electrodes, each of the storage capacitors being arranged above the corresponding thin film transistor so as to overlap at least a channel region of the thin film transistor in plan view of the substrate, each of the storage capacitors including a lower electrode composed of a polysilicon film, and a dielectric film, and an upper electrode composed of a metal film, stacked in this order from the bottom,
each of the dielectric films containing at least one of hafnium oxide and alumina.

* * * * *